(12) United States Patent
Chen (10) Patent No.: US 12,490,869 B1
(45) Date of Patent: Dec. 9, 2025

(54) LONG-LEGGED THREE-FOLD BATHTUB

(71) Applicant: Taizhou Xiaotanglang Infant and Child Products Co., Ltd., Taizhou (CN)

(72) Inventor: Jian Chen, Taizhou (CN)

(73) Assignee: TAIZHOU XIAOTANGLANG INFANT AND CHILD PRODUCTS CO., LTD., Taizhou (CN)

( * ) Notice: Subject to any disclaimer, the term of this patent is extended or adjusted under 35 U.S.C. 154(b) by 0 days.

(21) Appl. No.: 19/206,471

(22) Filed: May 13, 2025

(30) Foreign Application Priority Data

Aug. 6, 2024 (CN) .......................... 202421902030.7
Apr. 10, 2025 (CN) .......................... 202520673996.6

(51) Int. Cl.
*A47K 3/164* (2006.01)

(52) U.S. Cl.
CPC ..................................... *A47K 3/164* (2013.01)

(58) Field of Classification Search
CPC ....................................................... A47K 3/164
USPC ....................... 4/594, 592; 126/304; 248/188
See application file for complete search history.

(56) References Cited

U.S. PATENT DOCUMENTS

| | | | | | |
|---|---|---|---|---|---|
| 3,078,957 | A * | 2/1963 | Larson | ..................... | B25H 1/06 |
| | | | | | 248/188 |
| 3,174,629 | A * | 3/1965 | Gelberg | ................. | A47F 5/105 |
| | | | | | 40/605 |
| 3,315,930 | A * | 4/1967 | Cota | ..................... | F16M 11/105 |
| | | | | | 248/188 |
| 4,171,847 | A * | 10/1979 | Tukui | ................... | A47D 13/043 |
| | | | | | 248/188 |
| 4,790,416 | A * | 12/1988 | Baker | ...................... | A45C 9/00 |
| | | | | | 248/164 |
| 4,991,325 | A * | 2/1991 | Teduschi | ................. | D06F 81/04 |
| | | | | | 38/103 |
| 5,666,765 | A * | 9/1997 | Sarner | .................... | G07C 13/00 |
| | | | | | 312/351.9 |
| 7,240,881 | B2 * | 7/2007 | Crain | ..................... | F16M 11/10 |
| | | | | | 248/188 |
| 8,316,837 | B2 * | 11/2012 | Malumyan | .......... | A47J 37/0763 |
| | | | | | 126/30 |

FOREIGN PATENT DOCUMENTS

| | | | | | |
|---|---|---|---|---|---|
| CN | 110833350 A | * | 2/2020 | ............. | A01K 1/035 |
| DE | 3605496 A1 | * | 8/1987 | ............. | A47K 3/164 |
| WO | WO-2025039095 A1 | * | 2/2025 | ............. | A47K 3/164 |

* cited by examiner

*Primary Examiner* — Lori L Baker (57) ABSTRACT

A long-legged three-fold bathtub includes a bracket and a main body installed on the bracket. The long-legged three-fold bathtub further includes a locking component. The bracket is detachably connected to the main body through the locking component. The locking component has a locked state and an unlocked state. When the locking component is pressed, the locking component is in the unlocked state, and the bracket is separated from the main body. When the locking component is released, the locking component is in the locked state, and the bracket is connected to the main body.

19 Claims, 13 Drawing Sheets

LONG-LEGGED THREE-FOLD BATHTUB

CROSS-REFERENCE TO RELATED APPLICATIONS

The application claims priority of Chinese patent application CN202520673996.6, filed on Apr. 10, 2024, which is incorporated herein by reference in its entireties. The application also claims priority of Chinese patent application CN202421902030.7, filed on Aug. 6, 2024, which is incorporated herein by reference in its entireties.

TECHNICAL FIELD

The present invention relates to the field of bathtubs, particularly to a long-legged three-fold bathtub.

BACKGROUND ART

Traditional baby bathtubs are mostly designed in a fixed manner and have a large volume. Although the traditional baby bathtubs provide spacious bathing space, they bring great inconvenience to parents with limited family space or frequent outings in terms of storage and carrying. Although portable baby bathtubs have gradually emerged on the market, adopting folding or detachable designs to reduce storage volume, these existing portable baby bathtubs still have significant shortcomings in design and functionality. Specifically, some bathtubs still have a large volume after folding, making it difficult to fit into suitcases or car trunks, which limits their portability. At the same time, some bathtubs have poor support performance and are prone to collapse during use, causing safety hazards.

In order to solve the above problems, the present invention proposes a new bathtub that not only has excellent structural stability, but also is convenient for storage, transportation and carrying.

SUMMARY

In order to overcome the shortcomings of the prior art, a long-legged three-fold bathtub is provided in the present invention. The bathtub not only has excellent structural stability, but also is convenient for storage, transportation and carrying.

The technical solution adopted by the present invention to solve its technical problem is as follows.

A long-legged three-fold bathtub is provided in the present invention, including a bracket and a main body installed on the bracket. The long-legged three-fold bathtub further includes a locking component. The bracket is detachably connected to the main body through the locking component. The locking component has a locked state and an unlocked state. When the locking component is pressed, the locking component is in the unlocked state, and the bracket is separated from the main body. When the locking component is released, the locking component is in the locked state, and the bracket is connected to the main body.

As an improvement of the present invention, the bracket includes at least one first bracket, at least one second bracket, and an intermediate bracket positioned between the first bracket and the second bracket. Two ends of the intermediate bracket are respectively detachably connected to the first bracket and the second bracket.

As an improvement of the present invention, the intermediate bracket is provided with two adapter seats. The two adapter seats are rotatably connected. The intermediate bracket has an unfolded state and a folded state, and the two adapter seats are rotatable relative to each other, so that the intermediate bracket is movable between the unfolded state and the folded state.

As an improvement of the present invention, the first bracket includes two first support rods arranged opposite to each other. A first transverse rod is provided between the two first support rods. The first transverse rod is integrally formed and connected with the first support rod.

As an improvement of the present invention, the second bracket includes two second support rods arranged opposite to each other, and a second transverse rod arranged between the two second support rods. The second transverse rod is connected to the two second support rods through a first connecting member. The second transverse rod is provided with a first connecting portion. The second support rod is provided with a second connecting portion corresponding to the first connecting portion. The first connecting portion and the second connecting portion are connected through the first connecting member, so that the second transverse rod is connected to the two second support rods.

As an improvement of the present invention, a third transverse rod is also provided between the two second brackets. Two ends of the third transverse rod are respectively connected to the second transverse rod. The third transverse rod includes a first strut and a second strut. The first strut and the second strut are hinged by a hinge member, so that the third transverse rod is movable between an unfolded state and a folded state along with movement of the intermediate bracket.

As an improvement of the present invention, two ends of the adapter seat are respectively detachably connected to a first intermediate longitudinal rod and a second intermediate longitudinal rod. The first intermediate longitudinal rod is detachably connected to the first bracket. The second intermediate longitudinal rod is detachably connected to the second bracket. A fourth transverse rod is provided between the second intermediate longitudinal rods. Two ends of the fourth transverse rod are respectively movably connected to the second intermediate longitudinal rods through second connecting members. A reinforcement rod is provided between the first intermediate longitudinal rod and the second intermediate longitudinal rod. A first end of the reinforcement rod is fixedly arranged on the first intermediate longitudinal rod through a first fixing member, and a second end of the reinforcement rod is movably connected to the second intermediate longitudinal rod through a second fixing member.

As an improvement of the present invention, a sliding slot is defined in the fourth transverse rod. The sliding slot is provided with a first position and a second position. The second connecting member at one end of the fourth transverse rod is movable between the first position and the second position relative to the sliding slot. The fourth transverse rod has a supporting state and a relaxing state. When the fourth transverse rod is in the supporting state, the second connecting member is clamped to the first position of the sliding slot. When the fourth transverse rod is in the relaxing state, the second connecting member is movable from the first position to the second position relative to the sliding slot.

As an improvement of the present invention, the first bracket and the second bracket are respectively inserted into the intermediate bracket, and a reinforcing sleeving member is provided at an insertion area.

As an improvement of the present invention, the reinforcing sleeving member is a plastic reinforcing sleeving member.

As an improvement of the present invention, a length of the first bracket is in a range from 10 mm to 1000 mm, and a height of the first bracket is in a range from 10 mm to 500 mm.

As an improvement of the present invention, the length of the first bracket is in a range from 100 mm to 500 mm, and the height of the first bracket is in a range from 100 mm to 300 mm.

As an improvement of the present invention, a length of the second bracket is in a range from 10 mm to 1000 mm, and a height of the second bracket is in a range from 10 mm to 1000 mm.

As an improvement of the present invention, the length of the second bracket is in a range from 100 mm to 600 mm, and the height of the second bracket is in a range from 100 mm to 500 mm.

As an improvement of the present invention, a length of the intermediate bracket is in a range from 10 mm to 1000 mm, and a height of the intermediate bracket is in a range from 10 mm to 1000 mm.

As an improvement of the present invention, a length of the adapter seat is in a range from 10 mm to 500 mm, a width of the adapter seat is in a range from 10 mm to 500 mm, and a height of the adapter seat is in a range from 10 mm to 100 mm.

As an improvement of the present invention, a length of the third transverse rod is in a range from 100 mm to 1000 mm.

As an improvement of the present invention, a length of the main body is in a range from 10 mm to 1000 mm, a width of the main body is in a range from 10 mm to 1000 mm, and a height of the main body is in a range from 10 mm to 800 mm.

As an improvement of the present invention, an overall length of the bathtub is in a range from 10 mm to 1000 mm, a width of the bathtub is in a range from 10 mm to 1000 mm, and a height of the bathtub is in a range from 10 mm to 1200 mm.

As an improvement of the present invention, an overall length of the bathtub is in a range from 400 mm to 800 mm, a width of the bathtub is in a range from 200 mm to 600 mm, and a height of the bathtub is in a range from 600 mm to 1000 mm.

Beneficial effects of the present invention are as follows. The long-legged three-fold bathtub includes the bracket and the main body installed on the bracket. The long-legged three-fold bathtub further includes the locking component. The bracket is detachably connected to the main body through the locking component. The locking component has the locked state and the unlocked state. When the locking component is pressed, the locking component is in the unlocked state, and the bracket is separated from the main body. When the locking component is released, the locking component is in the locked state, and the bracket is connected to the main body. The bathtub has excellent structural stability, and the main body and the bracket are detachably connected through the locking component, making the assembly and disassembly of the bathtub more convenient, and allowing a user to move and store the bathtub with ease.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Referring to FIGS. 1-5, a long-legged three-fold bathtub 100 disclosed in the present invention includes a bracket 1000 and a main body 2000 installed on the bracket 1000. The long-legged three-fold bathtub 100 further includes a locking component 3000. The bracket 1000 is detachably connected to the main body 2000 through the locking component 3000. The locking component 3000 has a locked state and an unlocked state. When the locking component 3000 is pressed, the locking component 3000 is in the unlocked state, and the bracket 1000 is separated from the main body 2000. When the locking component 3000 is released, the locking component 3000 is in the locked state, and the bracket 1000 is connected to the main body 2000. The detachable connection between the bracket 1000 and the main body 2000 is achieved through the locking component 3000, so that the bathtub 100 of the present invention is easy to be stored, transported and carried.

In this embodiment, the bracket 1000 includes at least one first bracket 1001, at least one second bracket 1002, and an intermediate bracket 1003 positioned between the first bracket 1001 and the second bracket 1002. Two ends of the intermediate bracket 1003 are respectively detachably connected to the first bracket 1001 and the second bracket 1002. By using the intermediate bracket 1003 to achieve the detachable connection between the first bracket 1001 and the second bracket 1002, external forces can be evenly distributed, thereby improving the stability and load-bearing performance of the overall bracket 1000. At the same time, the bracket with the above structure is easy to disassemble and install, which is conducive to storage and transportation.

In this embodiment, the intermediate bracket 1003 is provided with two adapter seats 1004. The two adapter seats 1004 are rotatably connected. The intermediate bracket 1003 has an unfolded state and a folded state, and the two adapter seats 1004 are rotatable relative to each other, so that the intermediate bracket 1003 is movable between the unfolded state and the folded state. By arranging the two rotatably connected adapter seats 1004, the overall structure can be folded into a more compact form when not in use. This not only effectively saves storage space, but also facilitates transportation and on-site handling, improving the overall portability of the equipment.

In this embodiment, the first bracket 1001 includes two first support rods 1101 arranged opposite to each other. A first transverse rod 1102 is provided between the two first support rods 1101. The first transverse rod 1102 is integrally formed and connected with the first support rod 1101. By arranging the first transverse rod 1102, the first bracket 1001 is stably supported, avoiding local overload, effectively extending the service life of components, and improving the overall operational safety of the system.

In other embodiments, the first transverse rod 1102 can also be detachably connected to the first support rod 1101. Through the detachable connection, the entire structure can be easily assembled and disassembled when needed, thereby greatly simplifying the installation and disassembly process, while facilitating transportation and storage.

In this embodiment, the second bracket 1002 includes two second support rods 1103 arranged opposite to each other, and a second transverse rod 1104 arranged between the two second support rods 1103. The second transverse rod 1104 is connected to the two second support rods 1103 through a first connecting member 1105. The second transverse rod 1104 is provided with a first connecting portion 1106. The second support rod 1103 is provided with a second connecting portion 1107 corresponding to the first connecting portion 1106. The first connecting portion 1106 and the second connecting portion 1107 are connected through the first connecting member 1105, so that the second transverse rod 1104 is connected to the two second support rods 1103.

Preferably, the first connecting portion 1106 and the second connecting portion 1107 are screw holes. The first connecting member 1105 is a screw. The second transverse rod 1104 is connected to the second support rod 1103 through the screw. Through the above structure, an efficient and reliable fixing method is provided, the stability of the overall structure is ensured, the performance degradation caused by looseness of the connection is avoided, and meanwhile, the installation and disassembly process is simplified.

In this embodiment, a third transverse rod 1108 is also provided between the two second brackets 1002. Two ends of the third transverse rod 1108 are respectively connected to the second transverse rod 1104. By arranging the third transverse rod 1108, the rigidity and stability of the overall structure in a transverse direction are improved, effectively enhancing the torsion resistance property and the capability of resisting external disturbance of a bracket system. As a preferred option, the third transverse rod 1108 is welded onto the second transverse rod 1104.

Figure 4:
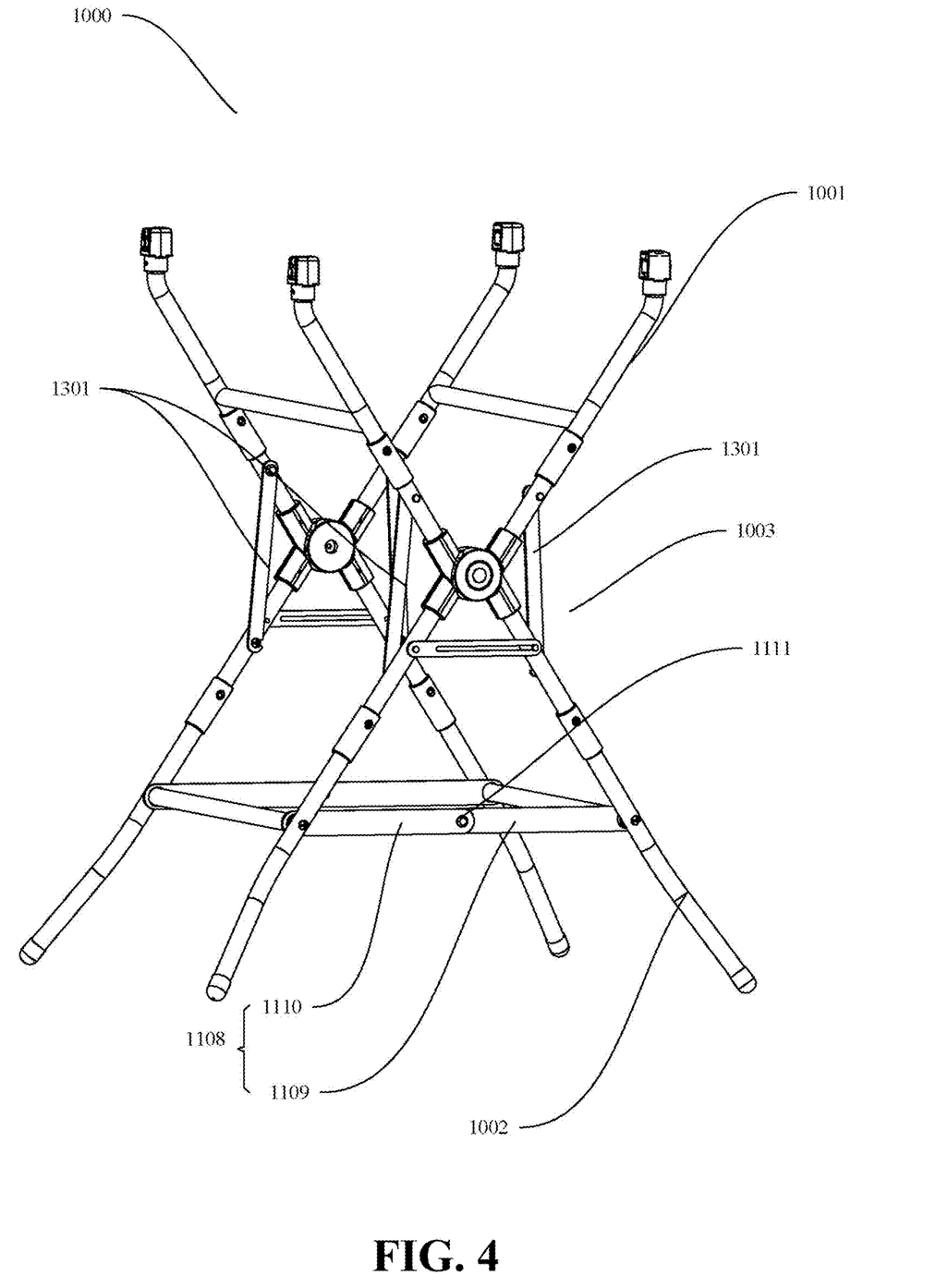
FIG. 4 is a schematic diagram of an unfolded structure of a third transverse rod.
Figure 5:
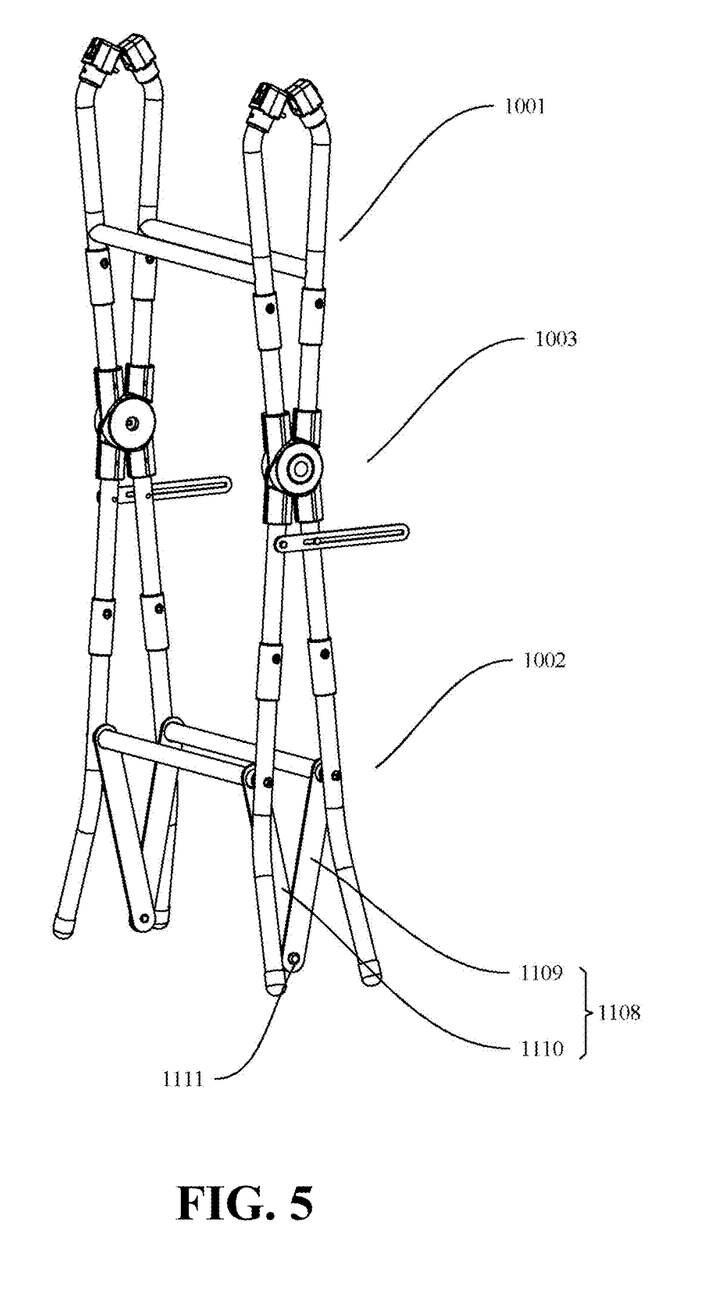
FIG. 5 is a schematic diagram of a folded structure of a third transverse rod.

In this embodiment, the third transverse rod 1108 includes a first strut 1109 and a second strut 1110. The first strut 1109 and the second strut 1110 are hinged by a hinge member 1111, so that the third transverse rod 1108 has an unfolded state and a folded state. Through the above structure, the second bracket 1002 is more convenient to store and does not occupy storage space.

Figure 1:
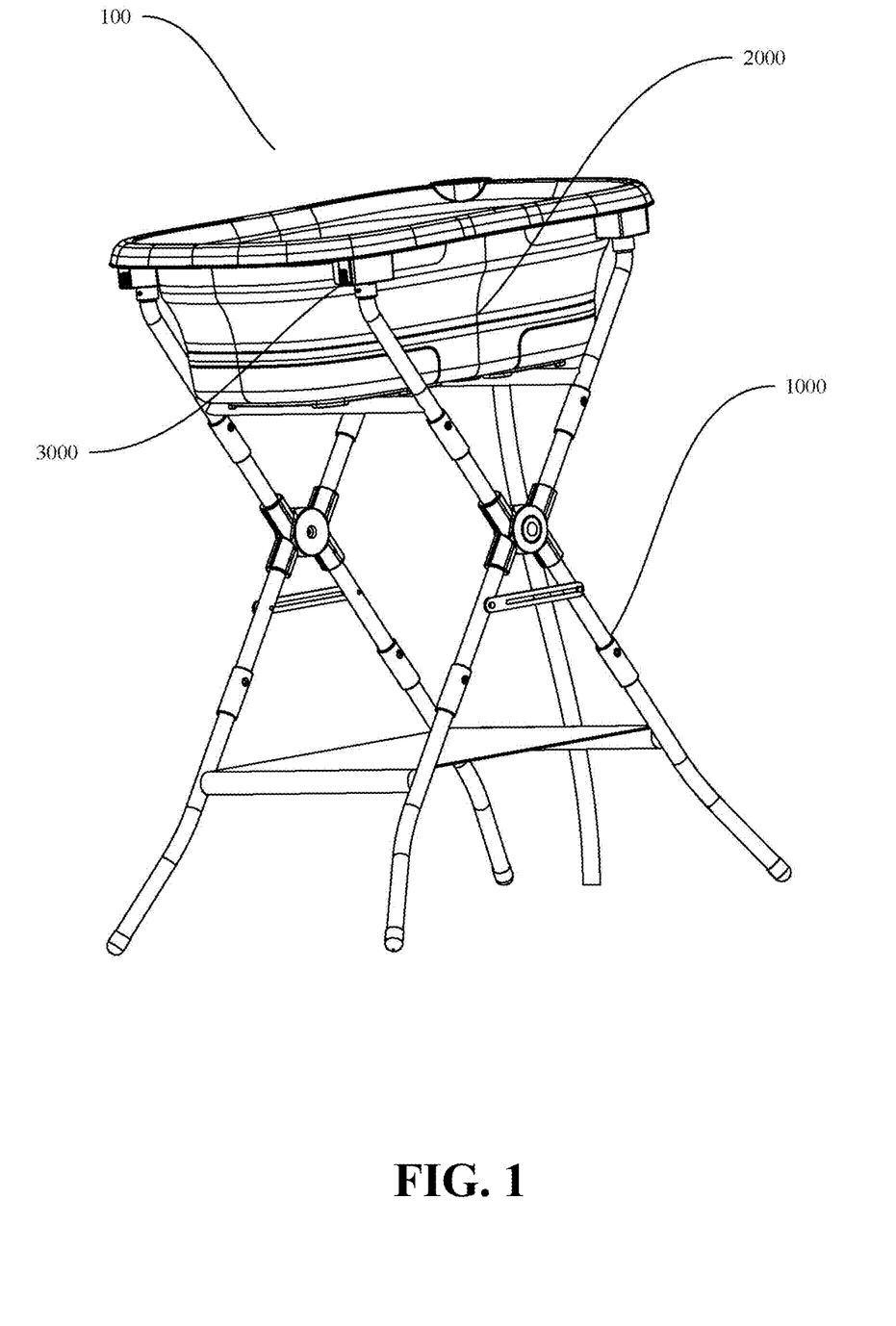
FIG. 1 is a schematic diagram of an overall structure of the present invention.
Figure 2:
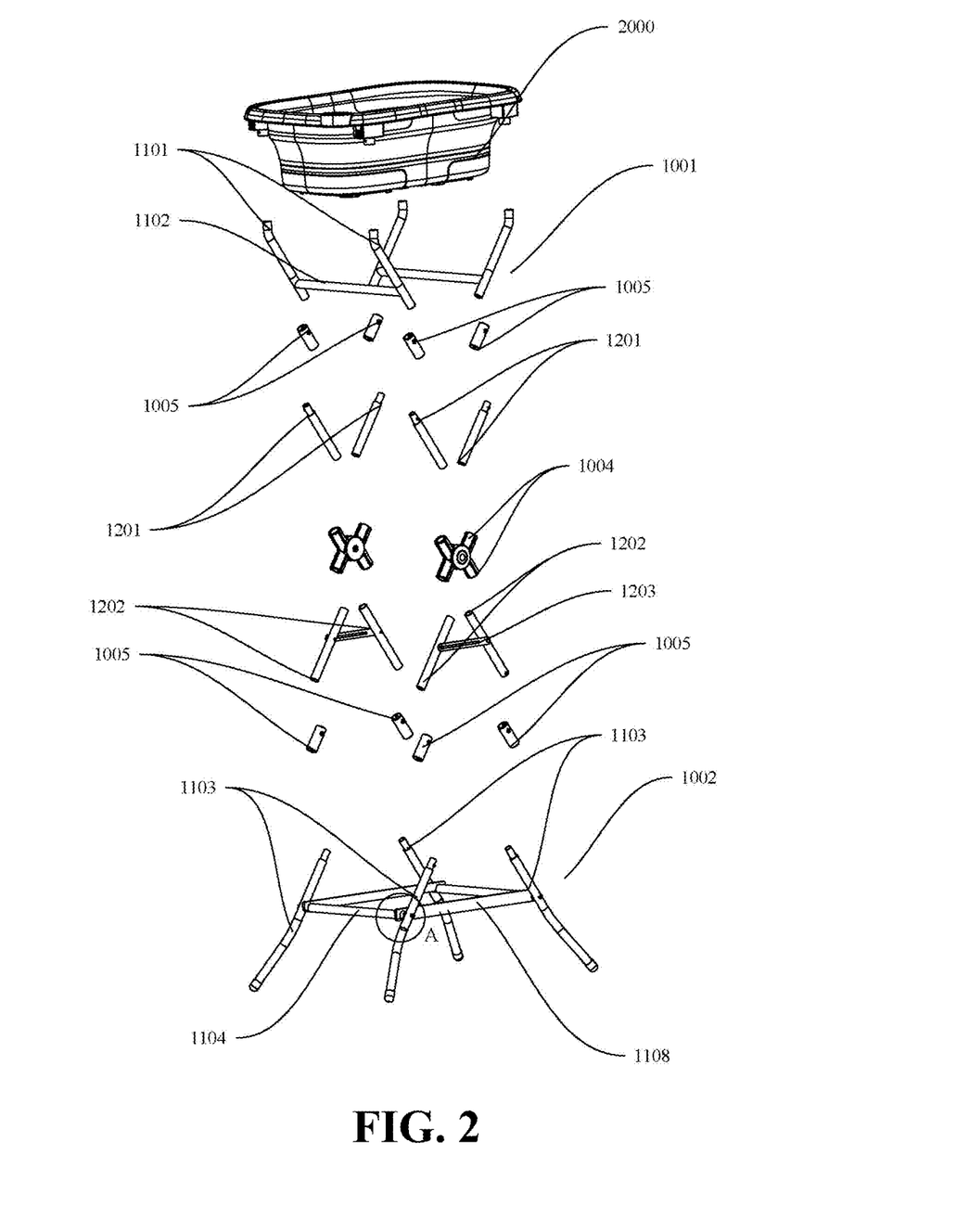
FIG. 2 is a schematic diagram of an overall explosive structure in the present invention.
Figure 3:
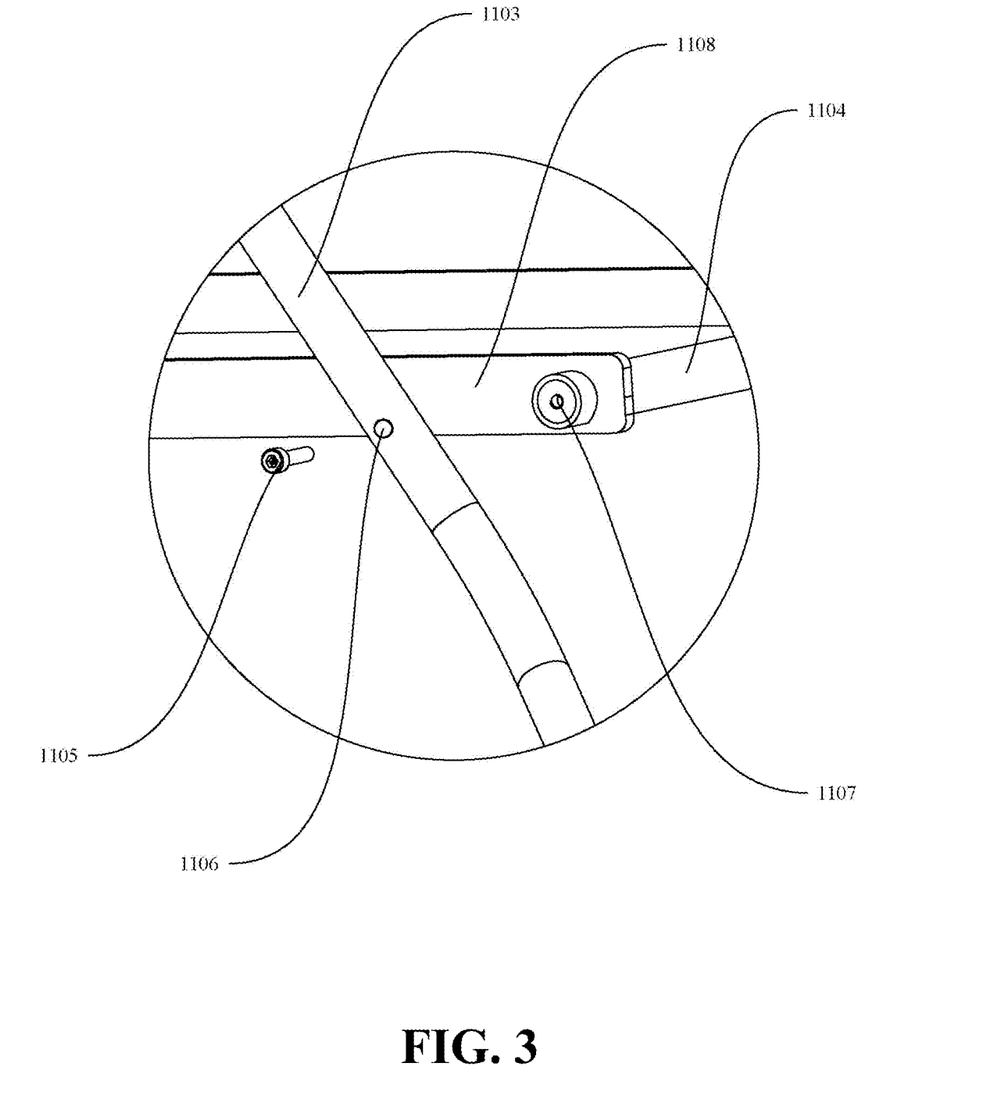
FIG. 3 is a partially enlarged view of area A in FIG. 2.

In this embodiment, two ends of the adapter seat 1004 are respectively detachably connected to a first intermediate longitudinal rod 1201 and a second intermediate longitudinal rod 1202. The first intermediate longitudinal rod 1201 is detachably connected to the first bracket 1001. The second intermediate longitudinal rod 1202 is detachably connected to the second bracket 1002. A fourth transverse rod 1203 is provided between the second intermediate longitudinal rods 1202. Two ends of the fourth transverse rod 1203 are respectively movably connected to the second intermediate longitudinal rods 1202 through second connecting members 1204. Through the above structure, the flexibility of the system is significantly enhanced, the operation is simpler and faster during assembly and disassembly, and the installation time and maintenance difficulty are reduced. Moreover, by arranging the fourth transverse rod 1203, the support stability of the second intermediate longitudinal rod 1202 can be effectively increased.

Figure 6:
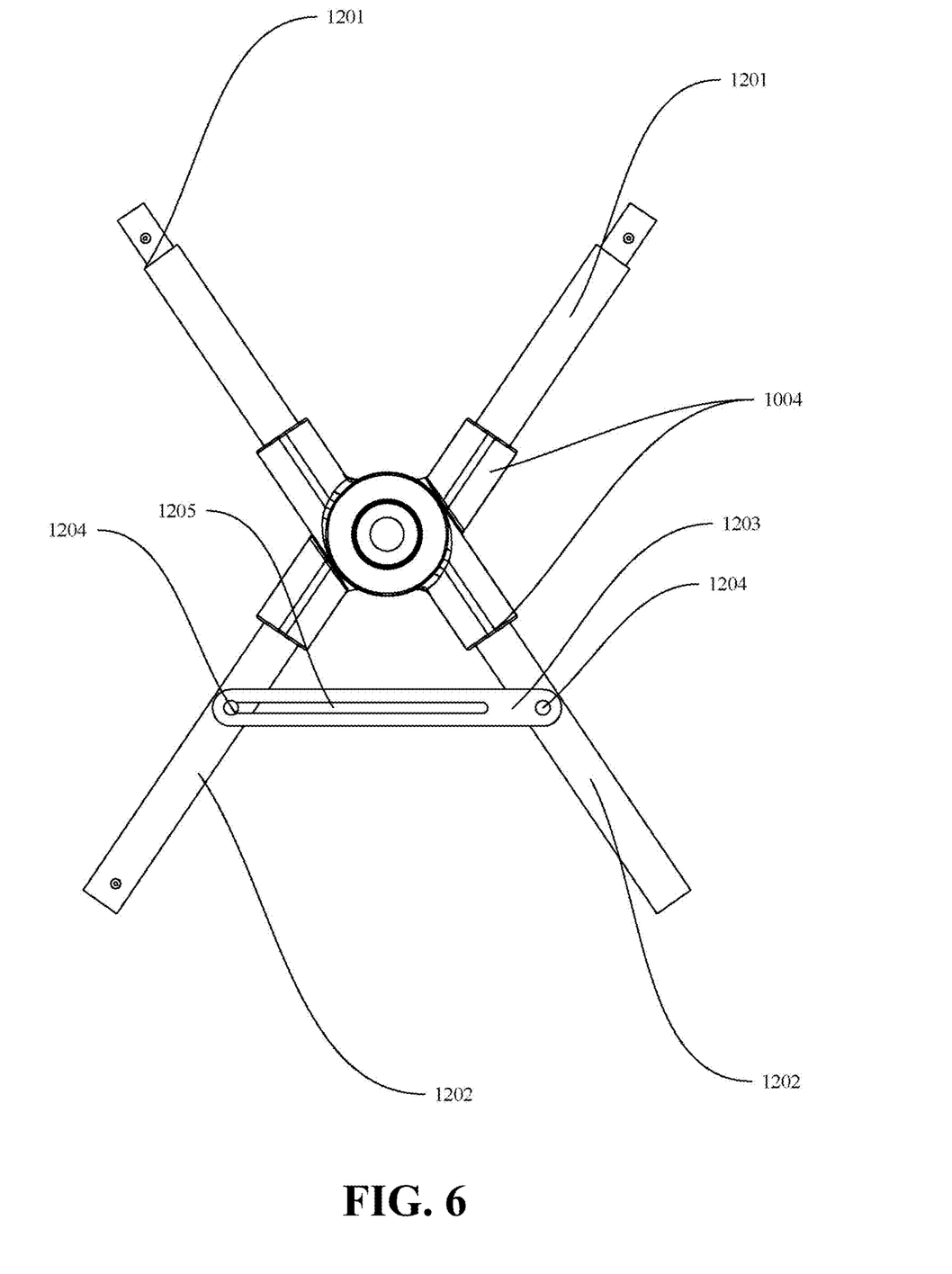
FIG. 6 is a schematic diagram of a structure of an intermediate bracket in an unfolded position.
Figure 7:
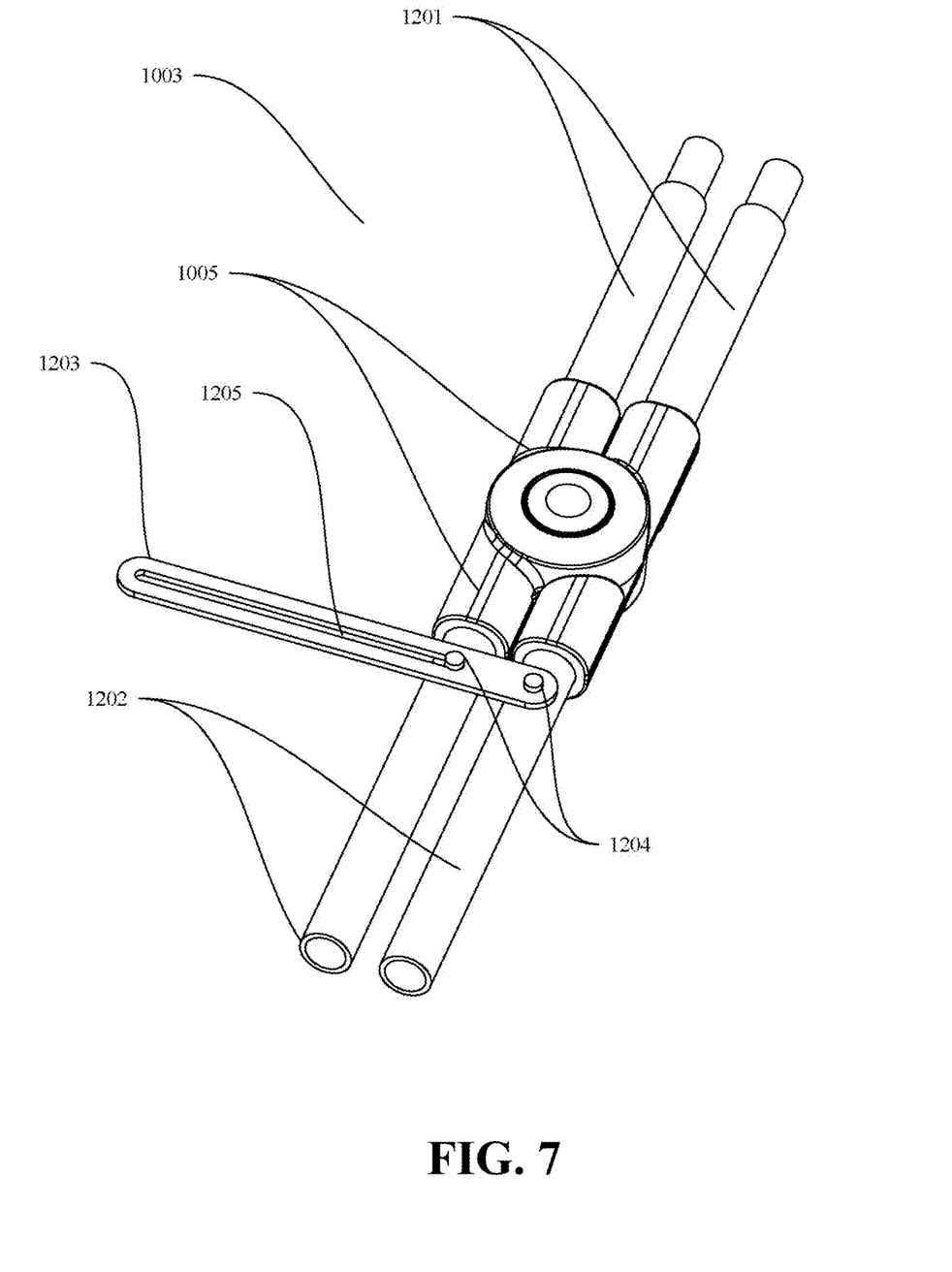
FIG. 7 is a schematic diagram of a structure of an intermediate bracket in a folded position.

In this embodiment, as shown in FIGS. 6-7, a sliding slot 1205 is defined in the fourth transverse rod 1203. The sliding slot 1205 is provided with a first position and a second position. The second connecting member 1204 at one end of the fourth transverse rod 1203 is movable between the first position and the second position relative to the sliding slot 1205, so that the fourth transverse rod 1203 has a supporting state and a relaxing state. When the fourth transverse rod 1203 is in the supporting state, the second connecting member 1204 is clamped to the first position of the sliding slot 1205, and at this time, the intermediate bracket 1003 is in the unfolded state. When the fourth transverse rod 1203 is in the relaxing state, the second connecting member 1204 is movable from the first position to the second position relative to the sliding slot 1205, and at this time, the intermediate bracket 1003 is in the folded state. When in the supporting state, the second connecting member 1204 is clamped in the first position to ensure structural stability. In the relaxing state, the second connecting member 1204 can be easily moved to the second position, thereby providing flexible functional switching for subsequent disassembly, assembly, adjustment, or maintenance. The above structure provides dynamic adjustment capability of state transition for the fourth transverse rod 1203, so that the fourth transverse rod 1203 can quickly switch states, thereby optimizing space utilization, and simplifying installation and maintenance. Moreover, the fourth transverse rod 1203 also improves the stability of the structure.

Figure 8:
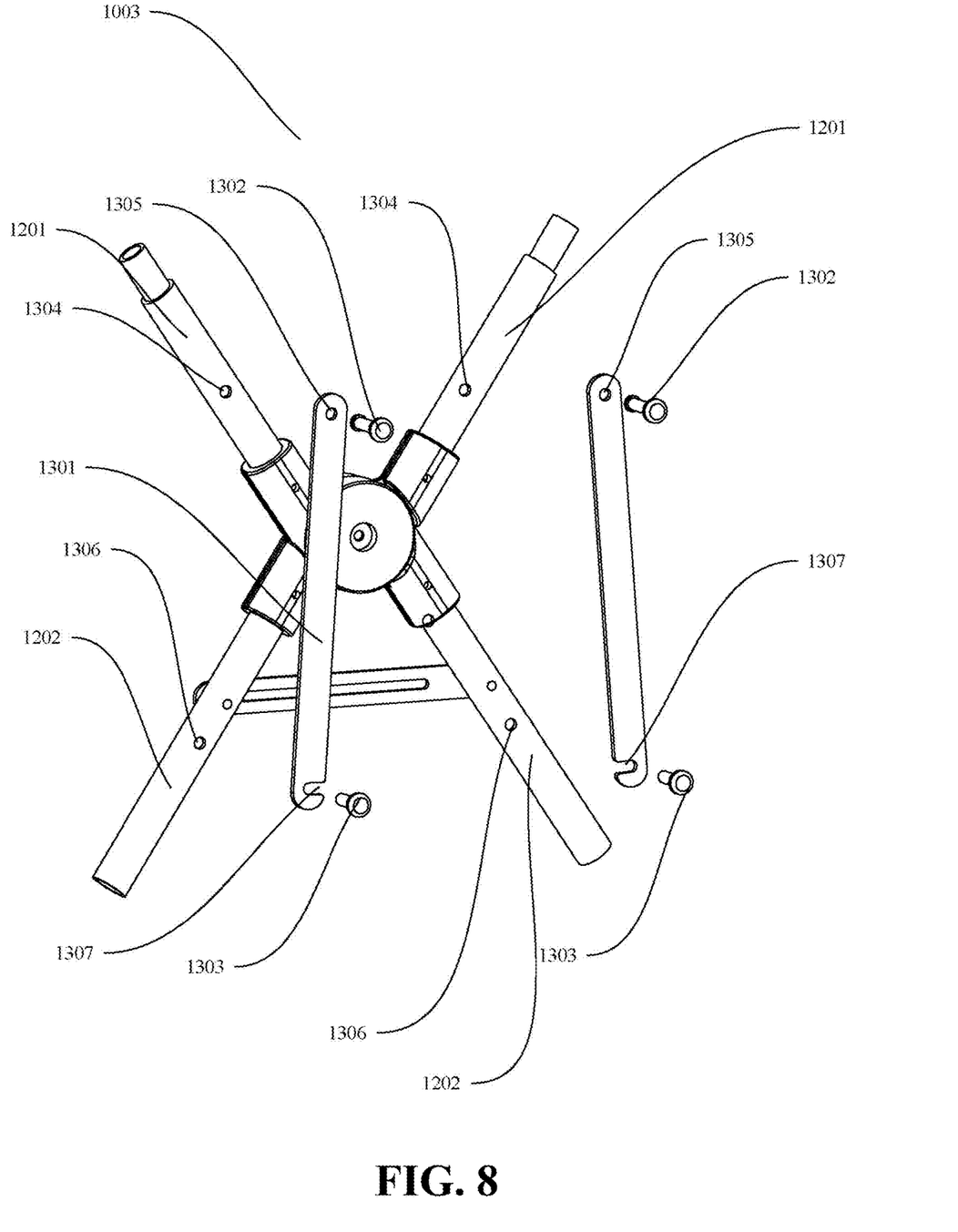
FIG. 8 is a schematic diagram of a connection structure between a reinforcement rod and an intermediate bracket.
Figure 9:
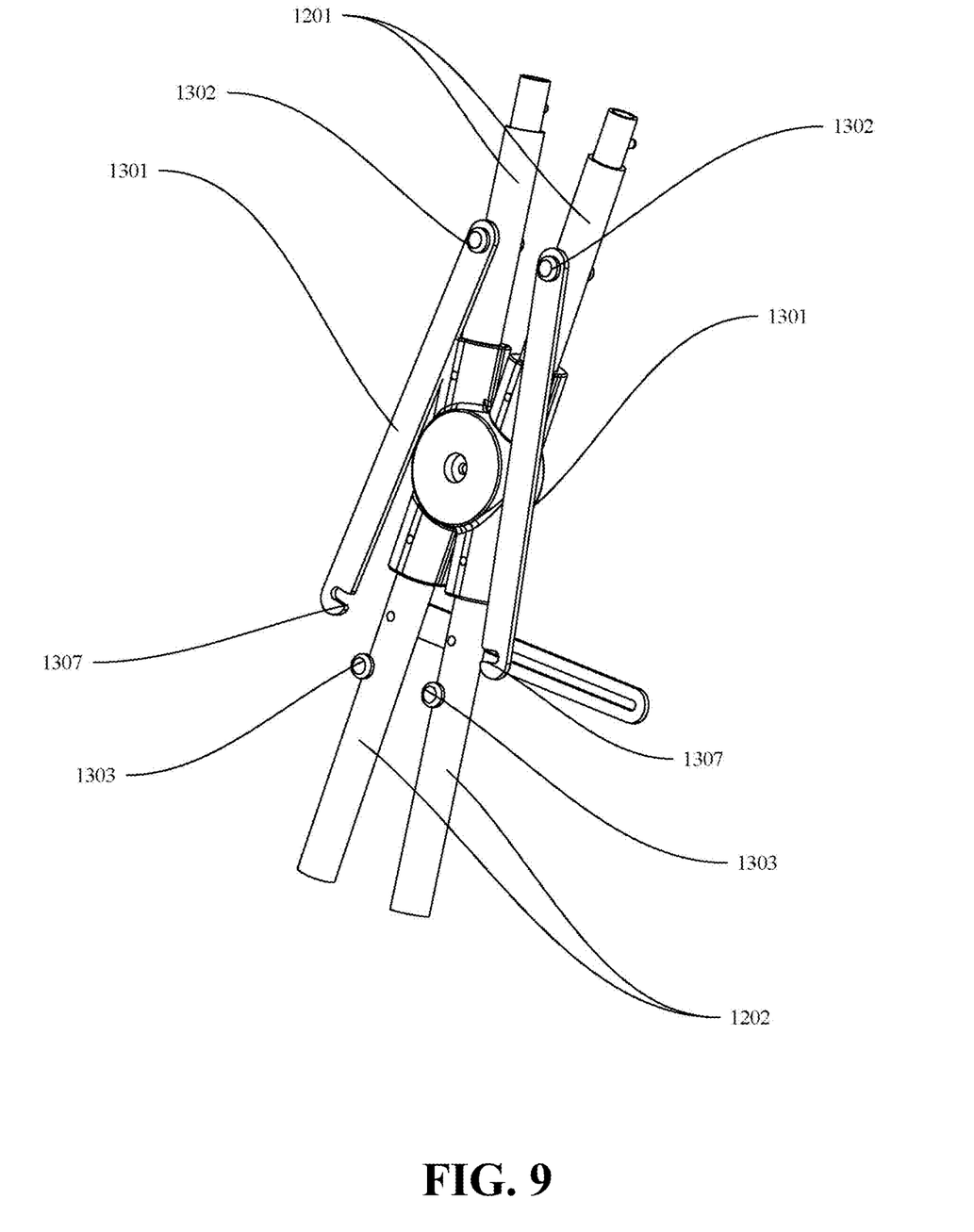
FIG. 9 is a schematic diagram of a structure of a reinforcement rod in another state.

In this embodiment, as shown in FIGS. 8-9, a reinforcement rod 1301 is provided between the first intermediate longitudinal rod 1201 and the second intermediate longitudinal rod 1202. A first end of the reinforcement rod 1301 is fixedly arranged on the first intermediate longitudinal rod 1201 through a first fixing member 1302, and a second end of the reinforcement rod 1301 is movably connected to the second intermediate longitudinal rod 1202 through a second fixing member 1303. Through the above structure, the support strength of the intermediate bracket 1003 can be effectively improved, avoiding shaking of the bathtub during use.

As a preferred option of this embodiment, the first intermediate longitudinal rod 1201 is provided with a first fixing hole 1304, and the first end of the reinforcement rod 1301 is provided with a second fixing hole 1305. The first fixing member 1302 is sequentially inserted into the second fixing hole 1305 and the first fixing hole 1304, so that the first end of the reinforcement rod 1301 is fixedly arranged on the first intermediate longitudinal rod 1201 through the first fixing member 1302. The second intermediate longitudinal rod 1202 is provided with a third fixing hole 1306, and the second end of the reinforcement rod 1301 is provided with an opening 1307. The opening 1307 is capable of being engaged with the second fixing member 1303. The second fixing member 1303 passes through the opening 1307 and the third fixing hole 1306 in sequence, so that the second end of the reinforcement rod 1301 is movably connected to the second intermediate longitudinal rod 1202 through the second fixing member 1303. When the intermediate bracket 1003 is in a folded state, the user needs to unfix the second fixing member 1303, so that the opening 1307 is disengaged from the reinforcement rod, thereby separating the reinforcement rod 1301 from the second intermediate longitudinal rod 1202 to fold and store the intermediate bracket 1003. As a preferred option, the first fixing member 1302 and the second fixing member 1303 are bolts.

In this embodiment, the first bracket 1001 and the second bracket 1002 are respectively inserted into the intermediate bracket 1003, and a reinforcing sleeving member 1005 is provided at an insertion area.

As a preferred option, the reinforcing sleeving member 1005 is a plastic reinforcing sleeving member 1005. By adding the reinforcing sleeving member 1005 at the insertion area, especially using the plastic reinforcing sleeving member 1005, the strength and stability of a connection part are improved. Plastic materials have good toughness and durability, ensuring that the bracket 1000 remains stable under stress and improving overall safety.

In other embodiments, the reinforcing sleeving member 1005 can also be a metal reinforcing sleeving member 1005. Metal has high mechanical strength, and the metal reinforcing sleeving member 1005 can significantly improve the stability and load-bearing capacity of the structure of the bracket 1000. In other embodiments, the reinforcing sleeving member 1005 can also be a rubber reinforcing sleeving member 1005. Rubber material has good elasticity and is capable of absorbing vibration and impact, while also providing an anti-slip function to enhance product safety. The rubber reinforcing sleeving member 1005 is capable of improving the sealing of a connection area, preventing water infiltration, and protecting the internal structure.

Referring to FIGS. 10-13, in this embodiment, a length L1 of the first bracket 1001 is in a range from 10 mm to 1000 mm, and a height H1 of the first bracket 1001 is in a range from 10 mm to 500 mm.

Figure 10:
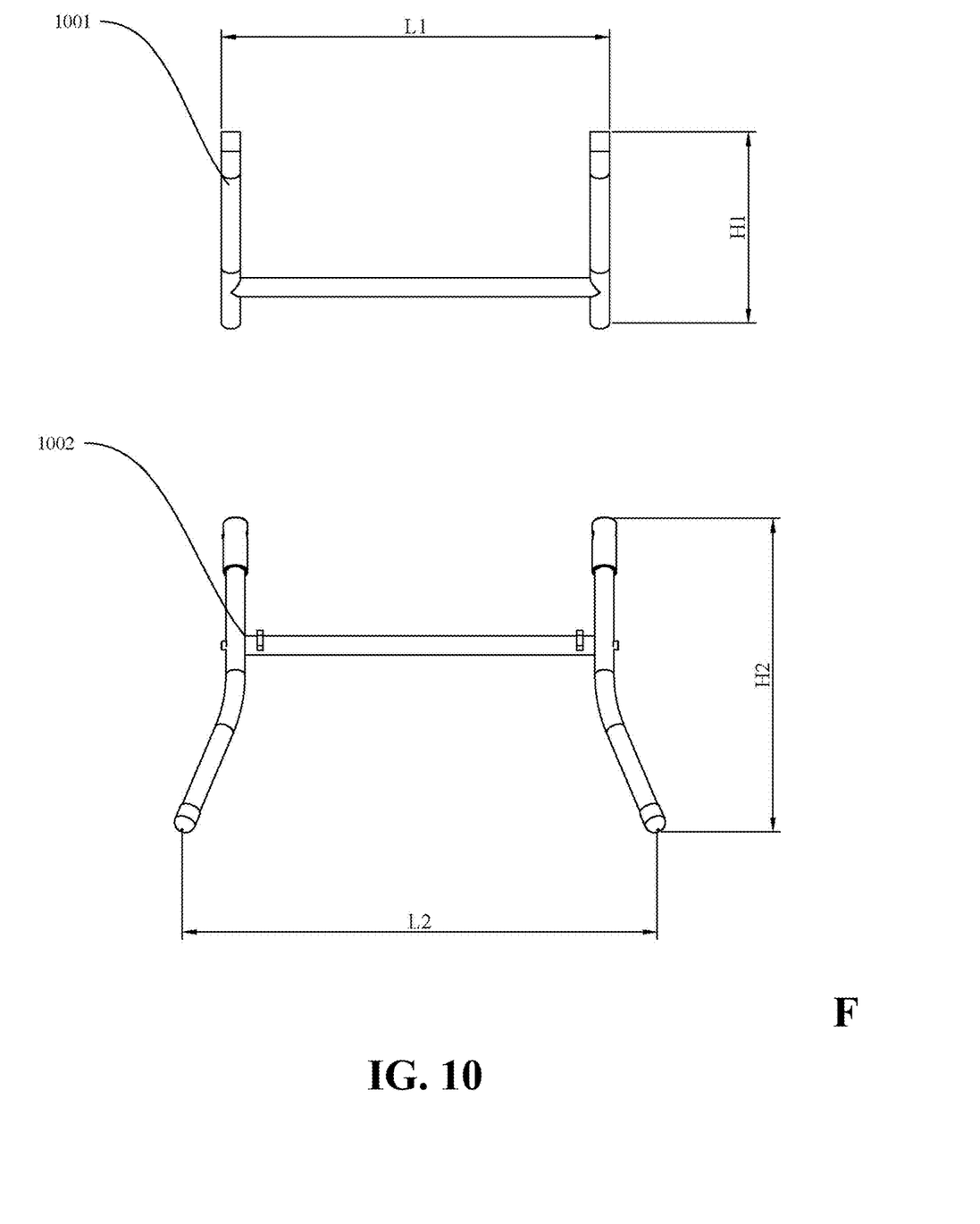
FIG. 10 is a schematic diagram of sizes of a first bracket and a second bracket.

In this embodiment, the length L1 of the first bracket 1001 is in a range from 100 mm to 500 mm, and the height H1 of the first bracket 1001 is in a range from 100 mm to 300 mm.

As a preferred option, the length L1 of the first bracket 1001 is 390 mm, and the height H1 of the first bracket 1001 is 250 mm.

In this embodiment, a length L2 of the second bracket 1002 is in a range from 10 mm to 1000 mm, and a height H2 of the second bracket 1002 is in a range from 10 mm to 1000 mm.

In this embodiment, the length L2 of the second bracket 1002 is in a range from 100 mm to 600 mm, and the height H2 of the second bracket 1002 is in a range from 100 mm to 500 mm.

As a preferred option, the length L2 of the second bracket in this embodiment is 490 mm, and the height H2 of the second bracket is 380 mm.

Figure 11:
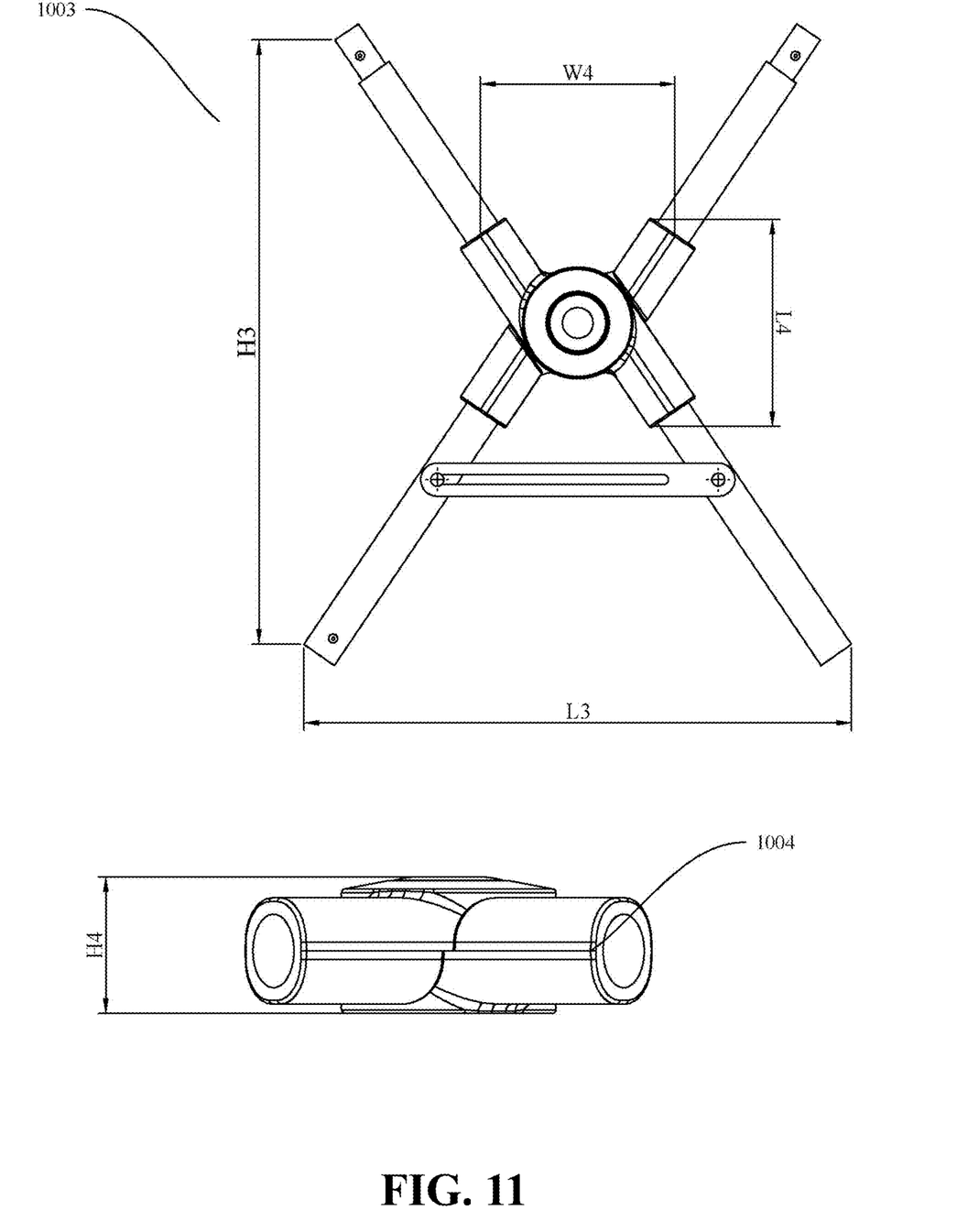
FIG. 11 is a schematic diagram of sizes of an intermediate bracket and an adapter seat.

In this embodiment, a length L3 of the intermediate bracket 1003 is in a range from 10 mm to 1000 mm, and a height H3 of the intermediate bracket 1003 is in a range from 10 mm to 1000 mm.

As a preferred option, when the intermediate bracket 1003 is in a folded position, the length L3 of the intermediate bracket 1003 is 60 mm, and the height H3 of the intermediate bracket 1003 is 400 mm.

In this embodiment, a length L4 of the adapter seat 1004 is in a range from 10 mm to 500 mm, a width W4 of the adapter seat 1004 is in a range from 10 mm to 500 mm, and a height H4 of the adapter seat 1004 is in a range from 10 mm to 100 mm.

As a preferred option, the length L4 of the adapter seat 1004 is 110 mm, the width W4 of the adapter seat 1004 is 60 mm, and the height H4 of the adapter seat 1004 is 40 mm.

Figure 12:
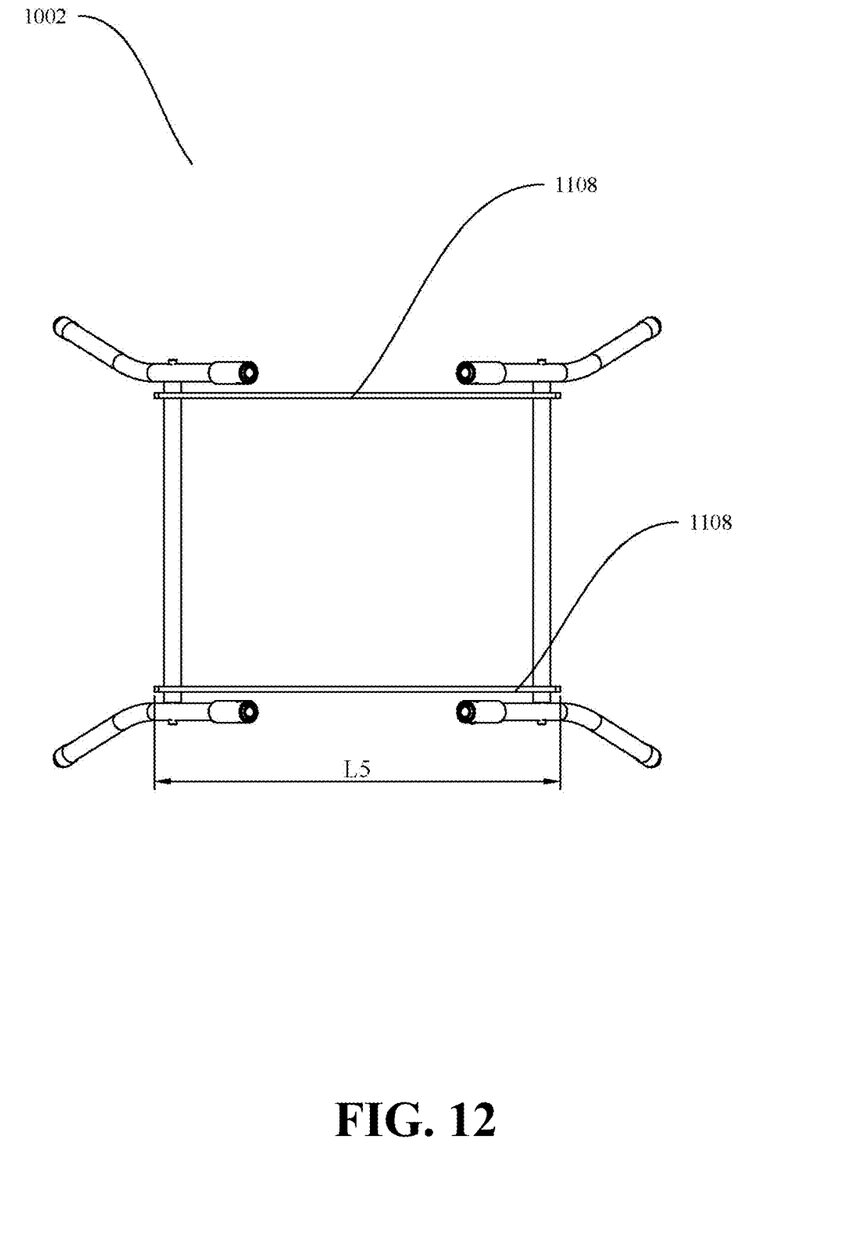
FIG. 12 is a schematic diagram of a size of a third transverse rod.

In this embodiment, a length L5 of the third transverse rod 1108 is in a range from 100 mm to 1000 mm.

As a preferred option, the length L5 of the third transverse rod 1108 in this embodiment is 450 mm.

Figure 13:
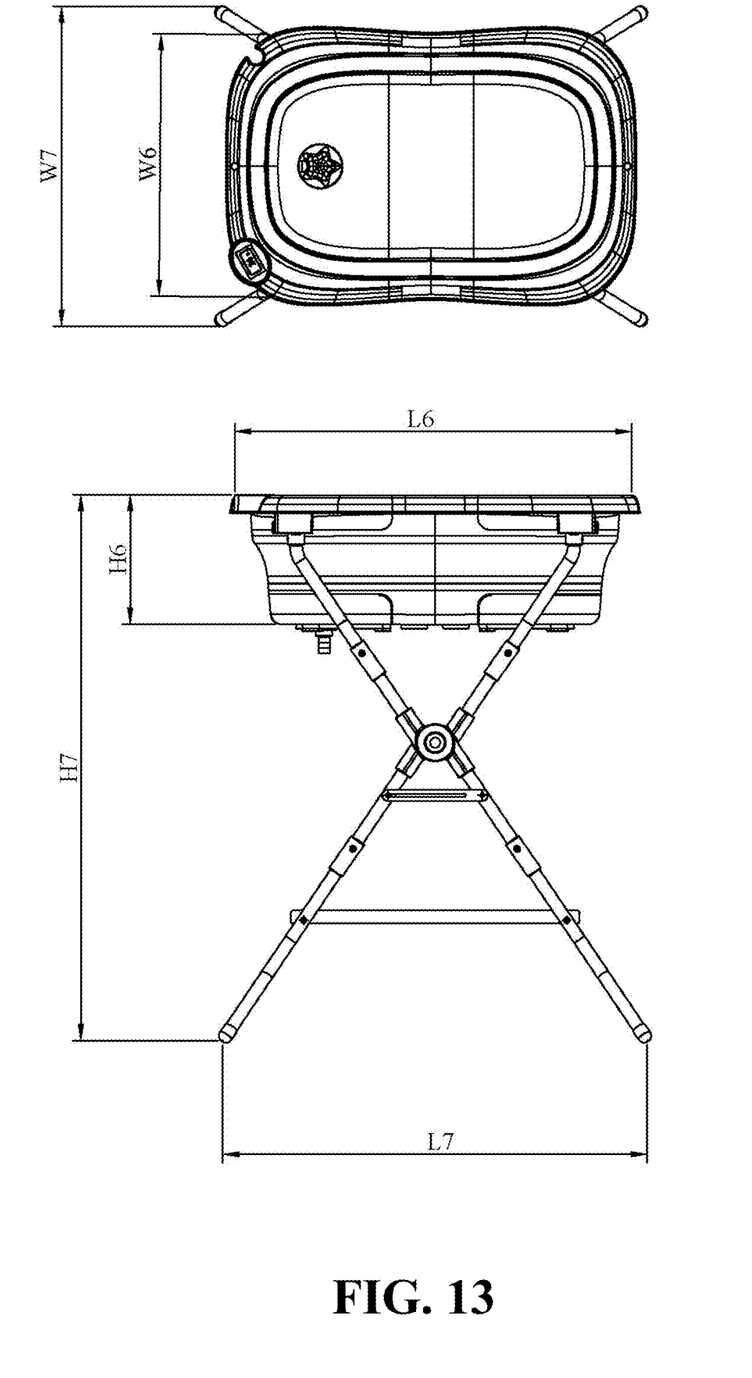
FIG. 13 is a schematic diagram of overall sizes of a main body and a bathtub.

In this embodiment, a length L6 of the main body 2000 is in a range from 10 mm to 1000 mm, a width W6 of the main body 2000 is in a range from 10 mm to 1000 mm, and a height H6 of the main body 2000 is in a range from 10 mm to 800 mm.

As a preferred option, the length L6 of the main body 2000 in this embodiment is 600 mm, the width W6 of the main body 2000 is 490 mm, and the height H6 of the main body 2000 is 220 mm.

In this embodiment, an overall length L7 of the bathtub 100 is in a range from 10 mm to 1000 mm, a width W7 of the bathtub 100 is in a range from 10 mm to 1000 mm, and a height H7 of the bathtub 100 is in a range from 10 mm to 1200 mm.

In this embodiment, the overall length L7 of the bathtub 100 is in a range from 400 mm to 800 mm, the width W7 of the bathtub 100 is in a range from 200 mm to 600 mm, and the height H7 of the bathtub 100 is in a range from 600 mm to 1000 mm.

As a preferred option, the overall length L7 of the bathtub in this embodiment is 660 mm, the width W7 of the bathtub is 500 mm, and the height H7 of the bathtub is 850 mm.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A long-legged three-fold bathtub, comprising:
a bracket;
a main body installed on the bracket; and
a locking component, wherein the bracket is detachably connected to the main body through the locking component;
wherein the locking component has a locked state and an unlocked state; when the locking component is pressed, the locking component is in the unlocked state, and the bracket is separated from the main body; and when the locking component is released, the locking component is in the locked state, and the bracket is connected to the main body;
wherein the bracket comprises at least one first bracket, at least one second bracket, and an intermediate bracket positioned between the first bracket and the second bracket; and two ends of the intermediate bracket are respectively detachably connected to the first bracket and the second bracket.

2. The long-legged three-fold bathtub according to claim 1, wherein the intermediate bracket is provided with two adapter seats; the two adapter seats are rotatably connected; the intermediate bracket has an unfolded state and a folded state; and the two adapter seats are rotatable relative to each other, so that the intermediate bracket is movable between the unfolded state and the folded state.

3. The long-legged three-fold bathtub according to claim 2, wherein the first bracket comprises two first support rods arranged opposite to each other; a first transverse rod is provided between the two first support rods; and the first transverse rod is integrally formed and connected with the first support rod.

4. The long-legged three-fold bathtub according to claim 3, wherein the second bracket comprises two second support rods arranged opposite to each other, and a second transverse rod arranged between the two second support rods; the second transverse rod is connected to the two second support rods through a first connecting member; the second transverse rod is provided with a first connecting portion; the second support rod is provided with a second connecting portion corresponding to the first connecting portion; and the first connecting portion and the second connecting portion are connected through the first connecting member, so that the second transverse rod is connected to the two second support rods.

5. The long-legged three-fold bathtub according to claim 4, wherein a third transverse rod is also provided between the two second brackets; two ends of the third transverse rod are respectively connected to the second transverse rod; the third transverse rod comprises a first strut and a second strut; and the first strut and the second strut are hinged by a hinge member, so that the third transverse rod has an unfolded state and a folded state.

6. The long-legged three-fold bathtub according to claim 2, wherein two ends of the adapter seat are respectively detachably connected to a first intermediate longitudinal rod and a second intermediate longitudinal rod; the first intermediate longitudinal rod is detachably connected to the first bracket; the second intermediate longitudinal rod is detachably connected to the second bracket; a fourth transverse rod is provided between the second intermediate longitudinal rods; two ends of the fourth transverse rod are respectively movably connected to the second intermediate longitudinal rods through second connecting members; a reinforcement rod is provided between the first intermediate longitudinal rod and the second intermediate longitudinal rod; a first end of the reinforcement rod is fixedly arranged on the first intermediate longitudinal rod through a first fixing member; and a second end of the reinforcement rod is movably connected to the second intermediate longitudinal rod through a second fixing member.

7. The long-legged three-fold bathtub according to claim 6, wherein a sliding slot is defined in the fourth transverse rod; the sliding slot is provided with a first position and a second position; the second connecting member at one end of the fourth transverse rod is movable between the first position and the second position relative to the sliding slot; the fourth transverse rod has a supporting state and a relaxing state; when the fourth transverse rod is in the supporting state, the second connecting member is clamped to the first position of the sliding slot; and when the fourth transverse rod is in the relaxing state, the second connecting member is movable from the first position to the second position relative to the sliding slot.

8. The long-legged three-fold bathtub according to claim 1, wherein the first bracket and the second bracket are respectively inserted into the intermediate bracket; and a reinforcing sleeving member is provided at an insertion area.

9. The long-legged three-fold bathtub according to claim 8, wherein the reinforcing sleeving member is a plastic reinforcing sleeving member.

10. The long-legged three-fold bathtub according to claim 1, wherein a length of the first bracket is in a range from 10 mm to 1000 mm; and a height of the first bracket is in a range from 10 mm to 500 mm.

11. The long-legged three-fold bathtub according to claim 10, wherein the length of the first bracket is in a range from 100 mm to 500 mm; and the height of the first bracket is in a range from 100 mm to 300 mm.

12. The long-legged three-fold bathtub according to claim 1, wherein a length of the second bracket is in a range from 10 mm to 1000 mm; and a height of the second bracket is in a range from 10 mm to 1000 mm.

13. The long-legged three-fold bathtub according to claim 12, wherein the length of the second bracket is in a range from 100 mm to 600 mm; and the height of the second bracket is in a range from 100 mm to 500 mm.

14. The long-legged three-fold bathtub according to claim 1, wherein a length of the intermediate bracket is in a range from 10 mm to 1000 mm; and a height of the intermediate bracket is in a range from 10 mm to 1000 mm.

15. The long-legged three-fold bathtub according to claim 2, wherein a length of the adapter seat is in a range from 10 mm to 500 mm; a width of the adapter seat is in a range from 10 mm to 500 mm; and a height of the adapter seat is in a range from 10 mm to 100 mm.

16. The long-legged three-fold bathtub according to claim 2, wherein a length of the third transverse rod is in a range from 100 mm to 1000 mm.

17. The long-legged three-fold bathtub according to claim 1, wherein a length of the main body is in a range from 10 mm to 1000 mm; a width of the main body is in a range from 10 mm to 1000 mm; and a height of the main body is in a range from 10 mm to 800 mm.

18. The long-legged three-fold bathtub according to claim 1, wherein an overall length of the bathtub is in a range from 10 mm to 1000 mm; a width of the bathtub is in a range from 10 mm to 1000 mm; and a height of the bathtub is in a range from 10 mm to 1200 mm.

19. The long-legged three-fold bathtub according to claim 1, wherein an overall length of the bathtub is in a range from 400 mm to 800 mm; a width of the bathtub is in a range from 200 mm to 600 mm; and a height of the bathtub is in a range from 600 mm to 1000 mm.

\* \* \* \* \*